May 15, 1923.   1,455,502
L. H. MERTZ
IMPLEMENT HANDLE
Filed Jan. 16, 1922
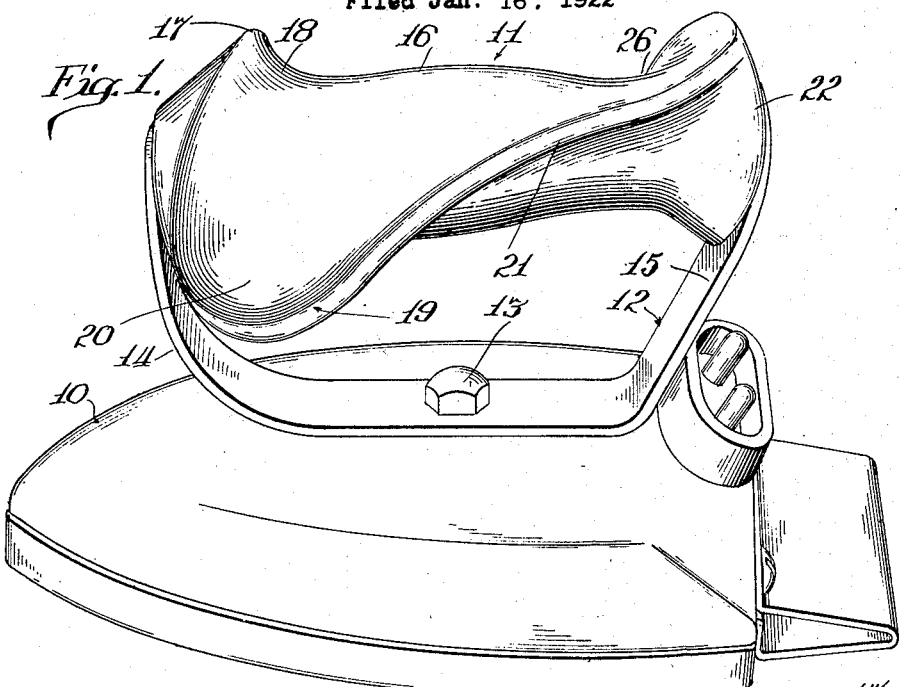
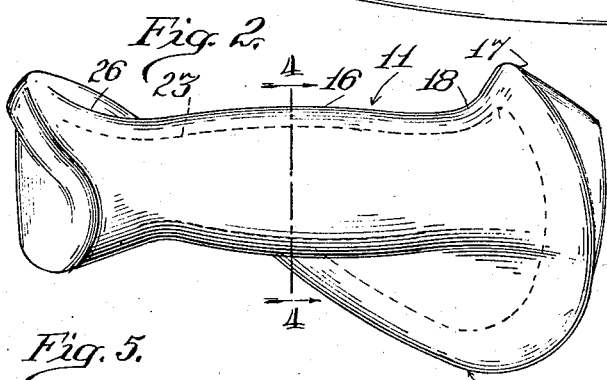
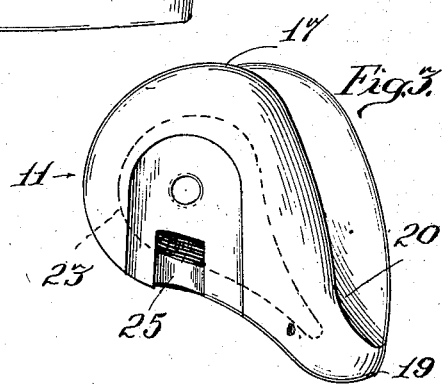
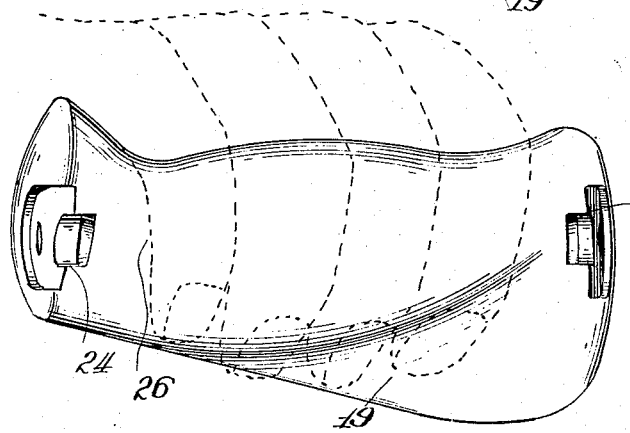
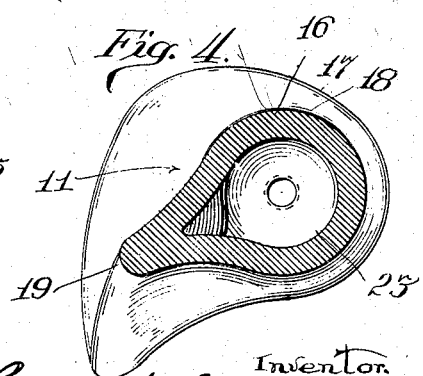
Inventor
Lewis H. Mertz
by Barnett & Truman
Attorneys Patented May 15, 1923.

1,455,502

UNITED STATES PATENT OFFICE.

LEWIS H. MERTZ, OF CHICAGO, ILLINOIS.

IMPLEMENT HANDLE.

Application filed January 16, 1922. Serial No. 529,495.

*To all whom it may concern:*

Be it known that I, LEWIS H. MERTZ, a citizen of the United States, residing at Chicago, in the county of Cook and State of Illinois, have invented certain new and useful Improvements in Implement Handles, of which the following is a specification.

My invention relates to handles or hand grips for flat irons, or other implements manipulated in the same general way as a flat iron is manipulated, and the primary object of the invention is to provide a handle for an implement of this type which will have a configuration that facilitates the handling of the implement when used, particularly by making it unnecessary to grasp the handle as tightly as must be done when the implement is provided with a handle or hand grip of the ordinary cylindrical or approximately cylindrical shape. When a flat iron, for example, is furnished with the improved handle of my invention the iron is more easily guided in its movements over the fabric and cramping of the fingers incident to keeping a tight grip on the handle is obviated. The labor of ironing or pressing is thus diminished.

For the further comfort of the user the handle, when forming part of a flat iron, is preferably constructed so that it may be kept cool by the circulation of air therethrough. This feature, however, is incidental and optional although desirable.

The invention is illustrated in a preferred embodiment, in the accompanying drawing wherein—

Fig. 1 is a view, in perspective, of a flat iron provided with a handle constructed in accordance with the invention.

Fig. 2 is a side view of the handle showing the opposite side thereof from that shown in Fig. 1.

Fig. 3 is a view, in elevation, of the forward end of the handle.

Fig. 4 is a sectional view on line 4—4 of Fig. 2, and

Fig. 5 is a bottom view of the handle showing the position of the fingers of the user.

Referring to the drawing, 10 designates the body of the flat iron, which is here shown incidentally as a flat iron of the electrically heated type, 11 the handle and 12 the handle support which is shown as a single piece of metal secured to the body of the iron by screw 13 and having upstanding end portions 14, 15 to which the handle is attached by any suitable means. This invention is concerned solely with the construction and configuration of the handle 11. The handle may be made of any suitable material such as cast metal, wood or plastic composition of one kind or another. It may be an integral structure or made in two or more parts suitably fastened together. The top portion 16 of the handle on which the palm of the hand rests, is preferably rounded from side to side and also slightly from end to end both on the top and on the right hand side. The forward end of the handle projects upwardly to a certain extent, as indicated at 17, to provide a hollow 18 for the portion of the hand between the fore finger and thumb. On one side of the handle at the forward end is a depending web 19 which is formed with a recess or depression 20 for the thumb. This web narrows toward the rear of the handle assuming an outwardly projecting position, as indicated at 21, along the rear portion of the side of the handle to provide a rest for the ball of the hand, the web extending around the rear portion of the handle and projecting upwardly, to provide a seat for the heel of the hand, as shown at 22. As a matter of fact, the web may be considered as beginning with the upper projection 17 at the forward end of the handle and continuing as described along the side and around the rear end thereof. The under surface of the handle, as shown particularly in Fig. 5, is relatively flat. I do not mean by this that it need be a plane surface but that its curvature is slight so that the finger joints, when the handle is grasped by the hand, are not flexed to any extent at their outer joints. From the middle joints the fingers are substantially straight. Viewed from its under side, the handle is wider at the front than at the back.

Preferably the handle is hollow, as indicated at 23, and openings 24, 25 into the interior of the handle are provided at opposite ends so that air may circulate through the handle to keep the same from becoming overheated.

With a flat iron, or other like implement, provided with a handle constructed as shown and described, the manipulation of the implement is facilitated. The thumb extends into the depression 20, the portion of the hand between the thumb and fore finger occupies the slight concavity indicated at 18. The ball of the hand, meaning the first joint of the thumb, rests on the outwardly extending projection 21. The heel of the hand seats in the recess forward of the rearward projection 22. The little finger fits into a hollow 26 in front of projection 22. The outer joints of the fingers lie flatwise, or nearly so, against the under surface. With the hand so disposed the flat iron may be guided backwardly and forwardly and from side to side with ease and without the necessity of a tight grip on the handle. The hand is not cramped at any time but grasps the handle easily and naturally having in view the nature of the movements required for manipulating the instrument.

I claim:

1. An implement handle comprising a smooth body portion for the palm of the hand formed with a web extending continuously along one side of and around the front and rear ends of the handle having a smooth surface for the fingers, said web projecting downwardly and laterally from the body at the front end and being formed with a thumb depression.

2. An implement handle having a rounded portion for the palm of the hand and, on one side thereof a laterally projecting web with an upper surface for the thumb and a lower surface for the fingers, which surfaces are smooth and continuous with the rounded portion of the handle and disposed so that in grasping the handle the outer joints of the thumb and fingers are not flexed to any appreciable extent.

3. An implement handle having a rounded portion for the palm of the hand and on one side thereof a laterally projecting web having a downward inclination from back to front, with an upper surface for the thumb and a lower surface for the fingers, which surfaces are smooth and continuous with the rounded portion of the handle and disposed so that in grasping the handle the outer joints of the thumb and fingers are not flexed to any appreciable extent.

LEWIS H. MERTZ.